Feb. 5, 1952     L. S. WILLIAMS     2,584,958
DIAL SCALE INDICATOR
Filed May 10, 1950
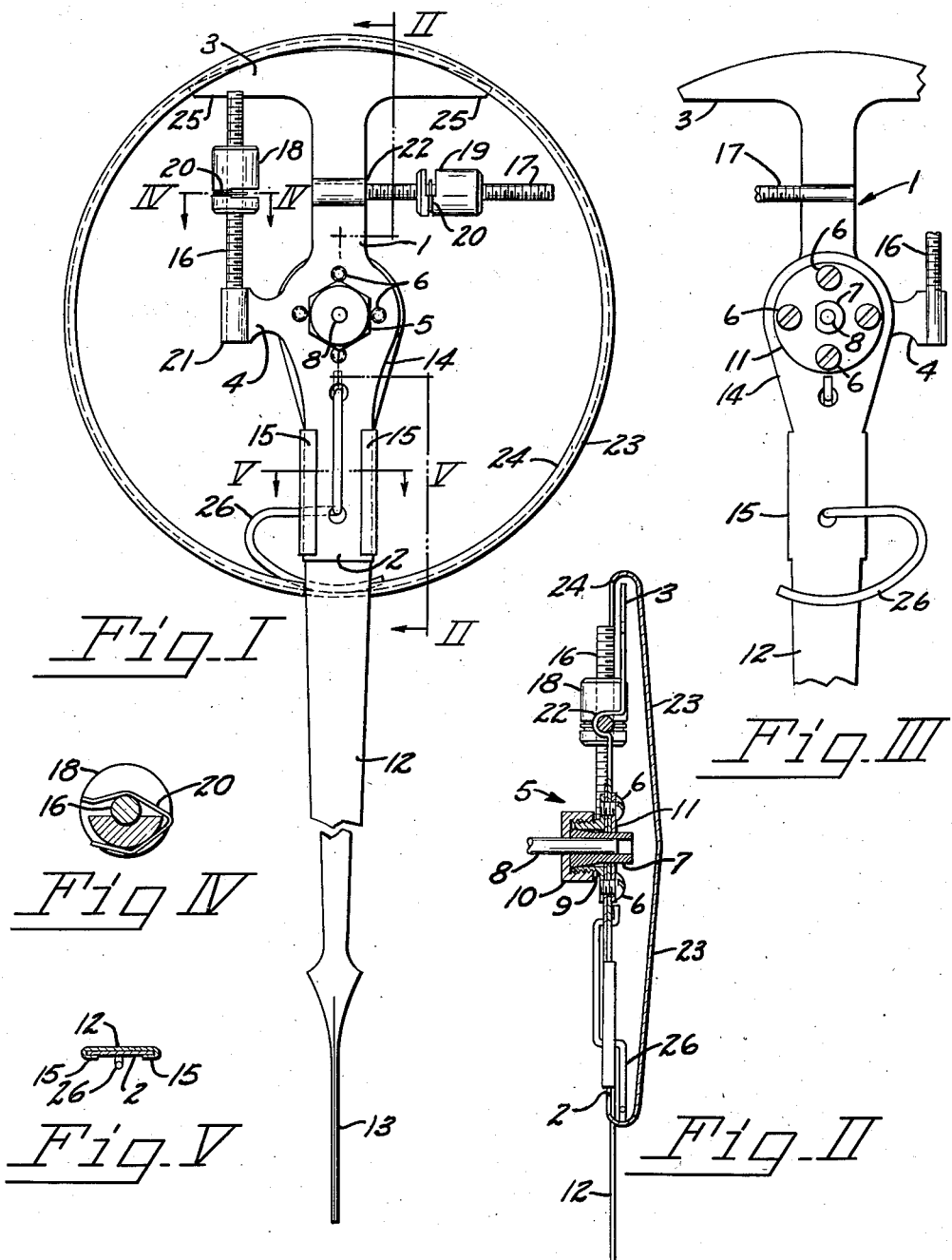
Inventor
Lawrence S. Williams
Marshall, Marshall & Leonard
Attorneys Patented Feb. 5, 1952

2,584,958

UNITED STATES PATENT OFFICE 2,584,958

DIAL SCALE INDICATOR

Lawrence S. Williams, Toledo, Ohio, assignor to Toledo Scale Company, Toledo, Ohio, a corporation of New Jersey Application May 10, 1950, Serial No. 161,196

3 Claims. (Cl. 116—136.5)

1

The invention relates to weighing scale indicators and in particular to an improved and mechanically simplified indicator for a dial scale.

A dial scale is usually provided with an annular chart and a centrally mounted indicator the tip of which sweeps over the chart and cooperates with the indicator on the shaft to show the magnitude of the load being weighed. To be commercially satisfactory the indicator of a dial scale must have reasonably good appearance. It must also be equipped with adjustable balance weights because certain errors in indication of the scale are corrected by unbalancing the indicator. Furthermore known types of indicator construction require that both the face of the housing and the back cover be removed in order to adjust the load counterbalancing mechanism.

The principal object of this invention is to provide an improved indicator of simple form constructed so that its balance adjustments may be easily reached from the rear of the dial housing.

Another object of the invention is to provide a weighing scale indicator that is easy to construct and that is readily adaptable to various scale constructions.

A still further object of the invention is to provide a weighing scale indicator with spring locked counterbalance weights so that the balance of the indicator may be adjusted without the use of tools.

A still further object of the invention is to provide a weighting scale indicator with a spring held cover that conceals the hub and balance weight structure of the indicator.

More specific objects and advantages are apparent from the following description of a preferred embodiment of the invention.

According to the invention the improved indicator comprises a generally T-shaped spider that is fitted with a collet for mounting the spider on an indicator shaft, that has an indicator arm attached to and extending radially from the stem of the T-shaped spider, and that has a pair of threaded arms attached to the spider and lying in the plane of the spider, one of the arms extending parallel to the stem and the other perpendicular to the stem and each carrying adjustable balance weights. The improved indicator also includes a snap-on cover that engages a cross arm of the T-shaped spider and a spring mounted on the stem of the spider.

The preferred embodiment of the invention is illustrated in the accompanying drawings.

In the drawings:

Figure I is a rear elevation of the improved indicator.

2

Figure II is a vertical section taken substantially along the line II—II of Figure I.

Figure III is a fragmentary elevation of the spider portion of the improved indicator with the cover removed.

Figure IV is a transverse section of one of the arms and the balance weight thereon as seen from the line IV—IV of Figure I.

Figure V is a section through the stem of the spider and the indicator arm attached thereto as seen from the line V—V of Figure I.

These specific figures and the accompanying description are intended merely to illustrate the invention and not to limit its scope.

The improved weighing scale indicator comprises a spider 1 that is generally T-shaped in front elevation having a stem portion 2, a head portion 3 and a side arm 4. A collet assembly 5, also shown in Figure II, is attached to the spider 1 by means of four small screws 6.

Referring to Figure II the collet assembly 5 comprises a collet sleeve 7 arranged to grip an indicator shaft 8. The collet sleeve 7 has a conical portion that fits within a matching section of a flange sleeve 9 to be clamped therein by a nut 10 that is threaded onto the sleeve 9 to draw the conical section of the collet sleeve 7 into the flanged sleeve 9. The screws 6 attaching the spider 1 are threaded into the flange of the sleeve 9. As may be seen in Figure III the collet sleeve 7 has a flat side to fit a correspondingly shaped hole in a washer 11 arranged to clamp the spider 1 to the flanged sleeve 9.

An indicator arm 12 fashioned with a knife edge tip 13 is securely anchored to the spider 1 by having its other end 14 clamped between the washer 11 and the spider 1. The indicator arm 12 has flanges 15 that partially embrace the stem 2 of the spider 1. A pair of the threaded arms 16 and 17 are attached to the spider 1, the threaded arm 16 being secured to the arm 4 so that it lies in the plane of the spider and parallel to the stem thereof. The threaded arm 17 is attached to the stem of the spider and extends in the plane of the spider and perpendicular to its stem. Balance weights 18 and 19 are threaded on the threaded arms 16 and 17 respectively and by adjustment along the threaded arms control the condition of balance of the complete indicator. Each of the balance weights 18 and 19, in addition to being internally threaded to match the threads of the arms 16 and 17, is also circumferentially grooved to receive a hairpin spring 20. The grooves are deepened on one side to break into the threaded section so that the springs 20, which are quite stiff, may frictionally engage the threaded rods 16 and 17 to hold the balance weights 18 and 19 in adjusted position.

To fasten the threaded rods to the indicator and in particular to insure that the threaded arms 16 and 17 are in the plane of the spider and are mutually perpendicular, the side arm 4 and the stem of the spider are each stamped to provide U-shaped channels 21 and 22 to receive the threaded rods and hold them in position while they are being welded, brazed or soldered into place.

The spider portion of the improved indicator is concealed from view behind a spun or stamped cap 23. The cap 23 which has a shape similar to a shallow conical dish with an inturned rim 24 is held in position with one side of the rim 24 hooked over the end of laterally directed arms 25 of the head portion 3 of the spider 1 and with the diametrically opposite side of the cover 23 hooked over a spring 26 mounted in the stem 2 of the spider 1.

In this arrangement the cap or cover 23 may be easily installed or removed from the indicator without disturbing the adjustment of any parts of the indicator. The frictionally held balance weights 18 and 19 may be easily adjusted along the threaded rods 16 and 17 whether the cap 23 is in place or not. If the cap 23 is in place the weights 18 and 19 are adjusted from the back side of the scale housing by reaching through or past the load counterbalancing mechanism. This feature of easy adjustability makes it unnecessary to remove the front of the dial housing when making adjustments to the scale.

The formation of the indicator arm 12 and the spider 1 from separate pieces make it possible to easily substitute different styles of indicator arms without altering the remainder of the assembly. Also, should different styles of indicator arms 12 vary widely in weight, additional counter weights may be screwed to the head portion 3 of the spider 1 to counter balance the heavier indicator arms.

In this structure the spider 1 is a generally T-shaped structure with the head portion 3 constituting the top of the T-shape. The laterally extending side arm 4 may be considered as transforming the T-shape to an F-shape.

The point of attachment of the threaded rod 16 is immaterial. It may be mounted either from the arm 4 or from the arm 25 of the head portion 3. The only requirement is that the threaded rod extend parallel to the stem 2 and perpendicular to the other threaded rod 17.

Various modifications may be made in the specific details of construction of the improved indicator without departing from the spirit and scope of the invention.

Having described the invention, I claim:

1. An indicator for a dial scale the indicator comprising a generally T-shaped spider having a bar extending laterally from the stem, clamping means secured to the spider near the intersection of the stem and bar of the T-shaped spider to mount the spider on a shaft, an indicator arm attached to and extending in line with the stem of the T-shaped spider, a pair of threaded arms one attached to the end of the bar and extending parallel to the stem, the other attached to the stem of the T-shaped spider and extending parallel to the bar, a counterweight mounted on each threaded arm, a spring attached to the spider and extending past the end of the stem of the spider, and a cover supported in part by the spring and in part by the opposite end of the T-shaped spider.

2. An indicator for a dial scale, the indicator comprising a generally T-shaped spider, clamping means for mounting the spider on a shaft, an indicator arm attached to and extending radially from the stem of the T-shaped spider, a side arm extending from the stem of the T-shaped spider, a first threaded rod mounted on the spider and extending parallel to the stem, a second threaded rod mounted on the stem and extending perpendicular to the first rod, and a counterweight threaded on each rod.

3. An indicator for a scale, the indicator comprising a spider, clamping means for mounting the spider on a shaft, an indicator arm attached to one leg of the spider, a pair of threaded rods lying in the plane of the spider and perpendicular to each other, the rods each being received and secured in grooves in the spider, balance weights threaded onto the rods, each balance weight having a cross groove deep enough to intersect the threaded bore of the counterweight, and a spring clip engaged in the slot and frictionally engaging the threaded rod.

LAWRENCE S. WILLIAMS.

No references cited.